United States Patent
Shibata

(10) Patent No.: US 10,326,716 B2
(45) Date of Patent: Jun. 18, 2019

(54) INFORMATION PROCESSING DEVICE AND INFORMATION MANAGEMENT DEVICE

(71) Applicant: FUJI XEROX CO., LTD., Tokyo (JP)

(72) Inventor: Hirohito Shibata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 67 days.

(21) Appl. No.: 15/596,335

(22) Filed: May 16, 2017

(65) Prior Publication Data

US 2018/0069812 A1 Mar. 8, 2018

(30) Foreign Application Priority Data

Sep. 5, 2016 (JP) ................................ 2016-173140

(51) Int. Cl.
| | | |
|---|---|---|
| *G06F 15/16* | (2006.01) | |
| *H04L 12/58* | (2006.01) | |
| *G06F 1/16* | (2006.01) | |
| *H04L 29/06* | (2006.01) | |

(52) U.S. Cl.
CPC .............. *H04L 51/04* (2013.01); *G06F 1/169* (2013.01); *G06F 1/1698* (2013.01); *H04L 63/302* (2013.01); *G06F 2200/1636* (2013.01); *G10H 2210/076* (2013.01); *H04L 67/42* (2013.01)

(58) Field of Classification Search
USPC ........................................................... 709/204
See application file for complete search history.

(56) References Cited

U.S. PATENT DOCUMENTS

| | | | | |
|---|---|---|---|---|
| 4,347,827 A | * | 9/1982 | LoCascio | F02P 3/0453 123/618 |
| 4,855,894 A | * | 8/1989 | Asahi | H03D 7/00 363/157 |
| 6,470,341 B1 | | 10/2002 | Rekimoto | |
| 8,156,275 B2 | * | 4/2012 | de Cesare | G06F 9/526 710/200 |
| 2004/0215815 A1 | * | 10/2004 | Rekimoto | H04L 67/14 709/236 |
| 2004/0263479 A1 | * | 12/2004 | Shkolnikov | G06F 1/1626 345/169 |
| 2008/0201438 A1 | * | 8/2008 | Mandre | H04L 51/04 709/206 |
| 2011/0117938 A1 | * | 5/2011 | Pyo | G01S 5/0072 455/457 |
| 2013/0007031 A1 | * | 1/2013 | Makino | H04N 5/76 707/758 |
| 2016/0098049 A1 | * | 4/2016 | Fan | G05F 1/56 323/280 |

FOREIGN PATENT DOCUMENTS

| | | | |
|---|---|---|---|
| JP | 3900605 B2 | 4/2007 | |
| JP | 4329388 B2 | 9/2009 | |
| JP | 5120474 B2 | 1/2013 | |

* cited by examiner

*Primary Examiner* — Thanh T Nguyen
(74) *Attorney, Agent, or Firm* — Oliff PLC

(57) ABSTRACT

An information processing device includes a communication unit that, if the order and time interval of an operation performed on a first device representing the information processing device, and an operation performed on a second device representing another information processing device match at least one predetermined pattern representing a predetermined order and a predetermined time interval, performs a communication associated with the predetermined pattern between the first device and the second device.

17 Claims, 12 Drawing Sheets

FIG. 5

| RHYTHM | PERSON | | | |
|---|---|---|---|---|
| ABA | 1 | 5 | 10 | 20 |
| AAB | 3 | 11 | 57 | 233 |
| ABB | 2 | 15 | 44 | 193 |
| ABAB | 1 | 44 | 205 | 1653 |
| AB-A | 0 | 0 | 1 | 7 |
| AB-B | 4 | 39 | 112 | 446 |
| AB-C | 6 | 107 | 497 | 3390 |
| ABABA | 0 | 0 | 0 | 0 |
| ABA-A | 0 | 0 | 0 | 0 |
| ABA-C | 0 | 0 | 0 | 2 |
| AB-AB | 0 | 0 | 0 | 0 |
| TOTAL | 0 | 0 | 1 | 29 |
| NO OVERLAPS | 16 | 216 | 917 | 5953 |
| | 14 | 149 | 609 | 3281 |

| EVENT ID | TIME OF RECEIPT | DEVICE | EVENT |
|---|---|---|---|
| 1 | 11394 | 2 | Press |
| 2 | 12443 | 3 | Press |
| 3 | 12557 | 2 | Press |
| ... | | | |

FIG. 9

| RHYTHM | $L_2$ | | | $L_3$ | | | $L_4$ | | |
|---|---|---|---|---|---|---|---|---|---|
| | GRADIENT | INTERCEPT | t | SE | GRADIENT | INTERCEPT | t | SE | GRADIENT | INTERCEPT | t | SE |

| RHYTHM | GRADIENT | INTERCEPT | t | SE | GRADIENT | INTERCEPT | t | SE | GRADIENT | INTERCEPT | t | SE |
|---|---|---|---|---|---|---|---|---|---|---|---|---|
| ABA | 0.91 | 37.2 | 1.96 | 1676 | | | | | | | | |
| ... | | | | | | | | | | | | |
| ABAB | 0.96 | 14.1 | 1.94 | 2435 | 0.95 | 10.6 | 1.93 | 1894 | | | | |
| ... | | | | | | | | | | | | |
| ABA-C | 0.95 | 34.1 | 1.95 | 2779 | 1.44 | 170.0 | 1.96 | 2034 | 0 | 0 | 0 | 0 |
| ... | | | | | | | | | | | | |

FIG. 14

| FIELD | VALUE |
|---|---|
| SubSequence | $T_1T_2T_3$ |
| Candidates | ABAB, AB-C |
| FirstInterval | 156 |
| ArrivalTime | 23435 |

| EVENT ID | TIME |
|---|---|
| 1 | 06/24/2016  20:02:42 357 |
| 2 | 06/24/2016  20:02:43 113 |
| ... | |

| FIELD | VALUE |
|---|---|
| SubSequence | $T_1T_2T_3$ |
| Rhythm | ABAB |
| Time | 156 |
| Device | 4 |

INFORMATION PROCESSING DEVICE AND INFORMATION MANAGEMENT DEVICE

CROSS-REFERENCE TO RELATED APPLICATIONS

This application is based on and claims priority under 35 USC 119 from Japanese Patent Application No. 2016-173140 filed Sep. 5, 2016.

BACKGROUND

The present invention relates to an information processing device and an information management device.

SUMMARY

According to an aspect of the invention, there is provided an information processing device including a communication unit that, if the order and time interval of an operation performed on a first device representing the information processing device, and an operation performed on a second device representing another information processing device match at least one predetermined pattern representing a predetermined order and a predetermined time interval, performs a communication associated with the predetermined pattern between the first device and the second device.

BRIEF DESCRIPTION OF THE DRAWINGS

Exemplary embodiments of the present invention will be described in detail based on the following figures, wherein:

FIG. 5 illustrates the frequency of error detection for each rhythm;

FIG. 9 illustrates the results of regression analysis of $L_2$, $L_3$, and $L_4$ for each rhythm;

FIG. 14 illustrates an event message;

DETAILED DESCRIPTION

Hereinafter, exemplary embodiments of the present invention will be described with reference to the drawings.

Basic Principle

First, the basic principle on which the exemplary embodiments are based will be described.

Figure 1:
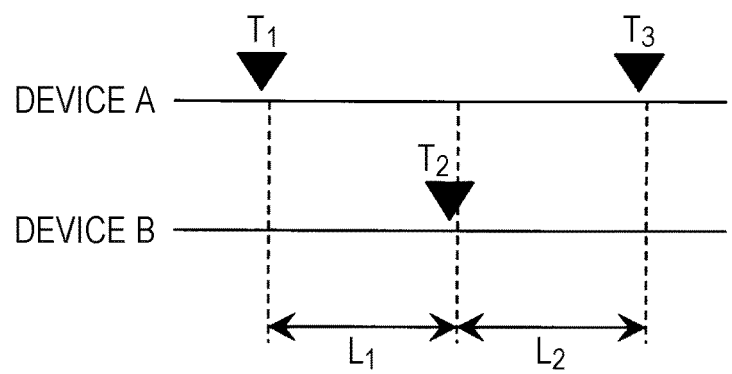
FIG. 1 schematically illustrates inputs made on multiple devices.

FIG. 1 is a sequence diagram illustrating the basic principle on which the exemplary embodiments are based. FIG. 1 assumes the presence of device A and device B as multiple information processing devices (such as data communication devices), and illustrates that operations (inputs) according to a predetermined pattern have been performed between device A and device B.

This corresponds to a pattern that begins with input $T_1$ as an operation performed on device A, followed by input $T_2$ as an operation performed on device B after a lapse of time $L_1$, and then followed by input $T_3$ performed on device A after a lapse of time $L_2$. Examples of inputs $T_1$, $T_2$, and $T_3$ include actions such as tapping a touch panel or depressing a button on device A and device B. The exemplary embodiments permit data to be transmitted and received between device A and device B by use of the following repetition of inputs mentioned above:

$$T_1 \to T_2 \to T_3.$$

In the exemplary embodiments, a periodic repetition of inputs will be referred to as "rhythmical input". Assuming that each input is a tap, it can be said that a rhythmical tap action is used to permit transmission and reception of data between device A and device B. The advantage of permitting transmission and reception of data through a rhythmical input is described below.

That is, it is relatively easy for one to beat out a rhythm alone, and thus this facilitates specifying of data transmission and reception. Beating out a rhythm with others is difficult, and thus this makes it possible to prevent erroneous operation or eavesdropping. Further, beating out a long rhythm is difficult, and thus it is possible to adjust the level of security by adjusting the length of a rhythm. As long as there is a leader (conductor), and one has an intention to act with the other party in a coordinated fashion, then it is possible to beat out a rhythm with the other party, thus enabling simultaneous distribution, that is, 1-to-N data transmission. This involves a body movement such as a tap, thus allowing for easy recognition of who is transmitting data to what device from what device, which facilitates coordinated action. Furthermore, the existence of a wide variety of rhythms, such as triplet rhythms, quadruplet rhythms, ABA, A-BA, and A-AB provides a potential for expansion.

The present inventors have conducted an experiment about multiple rhythms. The experiment is summarized as follows.

Participants: 15 persons (13 males and 2 females)

Age: 22 to 26 (average age: 23.8)

Dominant hand: 14 right-handed persons and 1 left-handed person

Task: subjective evaluation based on four criteria conducted for 99 rhythmical taps performed with left and right hands (on a five-point scale from one to five, with one being the most difficult and five being the least difficult)

Ease of tap at specified speed (one tap: 150 ms)

Ease of tap at high speed

Ease of remembering

Ease of getting used to (ease of familiarization)

Eight rhythms that are ranked high in overall evaluation based on the sum of mean points for the four criteria mentioned above are selected. Further, three more rhythms are selected for evaluation by taking into account a balance in terms of their length and the number of taps with the dominant hand. The total of 11 rhythms thus selected are as follows.

(1) ABA
(2) AAB
(3) ABB
(4) ABAB
(5) AB-A
(6) AB-B
(7) AB-C
(8) ABABA
(9) ABA-A
(10) ABA-C
(11) AB-AB

Now, "A" represents a tap with the dominant hand, "B" represents a tap with the non-dominant hand, "C" represents a tap with both hands, and "-" indicates the presence of a certain pause period between successive taps. For example, "AB-B" represents a rhythm that begins with a tap with the dominant hand, followed by a tap with the non-dominant hand, and then followed by a tap with the non-dominant hand after a certain pause period. A log of a minimum of five taps performed for each rhythm is collected. Further, a log is collected for each of the following cases.

(1) When beginning the rhythm with the dominant hand (Regular)
(2) When beginning the rhythm with the non-dominant hand (Reverse)

Further, a log of taps performed at the following four levels of speeds is collected.

(1) Preferred speed (Preferred)
(2) Slowly (Slow)
(3) As fast as possible (Fast)
(4) Specified speed (Specified)

These rhythms can be roughly classified into three-part rhythms, four-part rhythms, and a five-part rhythm.

The three-part rhythms include the following rhythms.

ABA
AAB
ABB
AB-A
AB-B
AB-C

Letting A be a first input, and B be a second input, ABA can be expressed as a rhythm beginning with the first input, followed by the second input, and then followed by the first input. AB-A can be expressed as a rhythm beginning with the first input, followed by the second input, and then followed by the first input performed after a relatively long period of time. AB-C can be expressed as a rhythm beginning with the first input, followed by the second input, and then followed by the first input and the second input that are performed after a relatively long period of time. The term "relatively long period of time" refers to the above-mentioned pause period, and means that this interval of time is long relative to the interval of time between the first input at the beginning of the rhythm and the second input that follows. Other examples of rhythms made up of three or more parts may include AA-B and AA-C.

The four-part rhythms include the following rhythms.

ABAB
ABA-A
ABA-C
AB-AB

Now, similarly as above, letting A be a first input, and B be a second input, ABAB can be expressed as a rhythm beginning with the first input, followed by the second input, followed by the first input, and then followed by the second input. ABA-C can be expressed as a rhythm beginning with the first input, followed by the second input, followed by the first input, and then followed by the first input and the second input that are performed after a relatively long period of time. AB-AB can be expressed as a rhythm beginning with the first input, followed by the second input, followed by the first input performed after a relatively long period of time, which is then followed by the second input.

The five-part rhythm is ABABA. Now, similarly as above, letting A be a first input, and B be a second input, ABABA can be expressed as a rhythm beginning with the first input, followed by the second input, followed by the first input, followed by the second input, and then followed by the first input.

Figure 2:
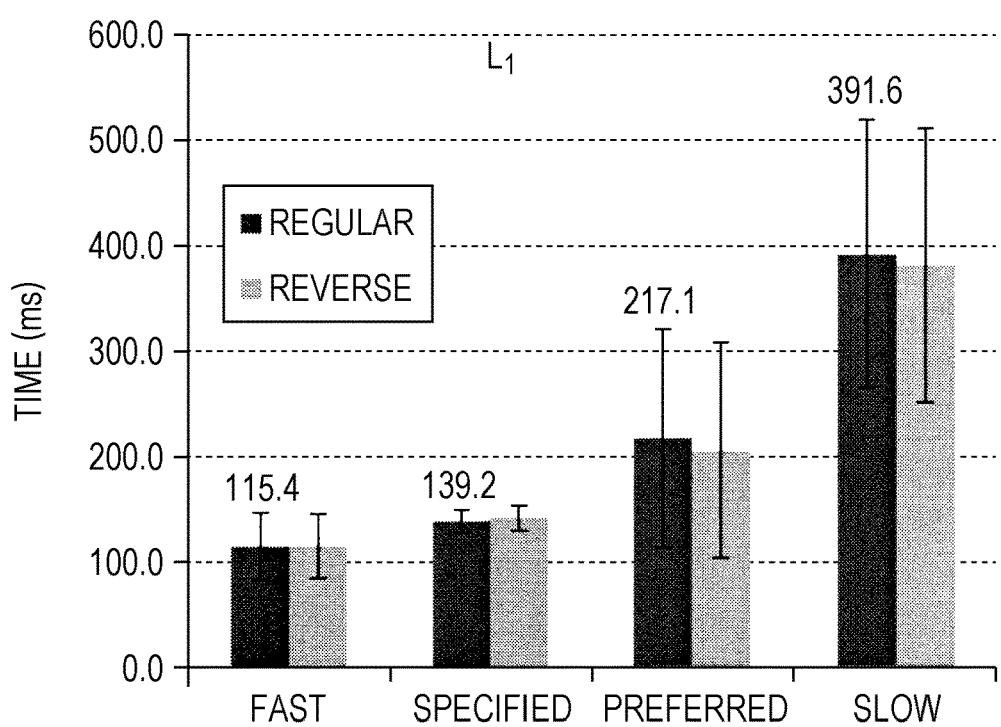
FIG. 2 is a graph illustrating the degree of variability with changing speed of rhythm.
Figure 3:
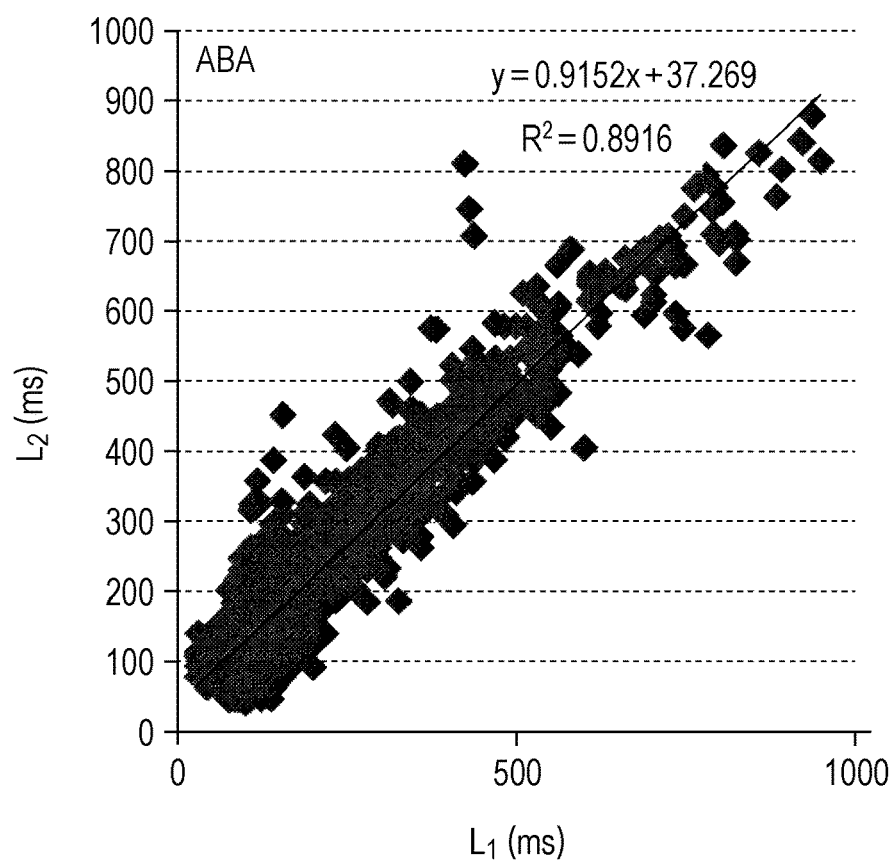
FIG. 3 is a graph illustrating the results of regression analysis for rhythm ABA.

FIGS. 2 and 3 illustrate the results of the experiment. FIG. 2 illustrates the length of a tap period for "Regular" and "Reverse", for each of the four levels of speeds: Fast, Specified, Preferred, and Slow. The length of the tap period for each level of speed is as follows.

Fast: 115.4 ms
Specified: 139.2 ms
Preferred: 217.1 ms
Slow: 391.6 ms

The above results indicate that the resulting rhythm does not change much between when started with the dominant hand and when started with the non-dominant hand. It can be appreciated, however, that greater temporal variations are observed for "Fast" and "Slow" than for "Specified".

For any two taps of interest, if the time difference between the two taps is equal to or less than 46.3 ms, then the two taps can be regarded as being performed simultaneously, whereas if the time difference between the two taps is within the range of 47.0 ms to 451.3 ms, this can be regarded as indicating the possibility of a rhythmical tap action with the two taps as base points. Hereinafter, the minimum and maximum values of this time range will be respectively designated $S_{min}$ and $S_{max}$. Further, the upper limit to which two taps can be regarded as being performed simultaneously will be designated $D_{max}$.

It has been further found that a relatively long pause tends to be taken.

For a series of taps to be determined as a rhythmical tap, the following criteria need to be met.

Criterion 1: Device Validity

For a tap sequence $T_1$, $T_2$, $T_3$ (see FIG. 1) to be determined as rhythm ABA, the following conditions need to be met.

device $(T_1) \neq$ device $(T_2)$ device $(T_1) =$ device $(T_3)$

In this case, device (T) indicates a device on which tap T is performed.

Criterion 2: Validity of the Interval Sequence

For a tap sequence $T_1$, $T_2$, $T_3$ to be determined as rhythm ABA, letting the time between tap A and the next tap B be $L_1$, and the time between tap B and the next tap A be $L_2$ (see FIG. 1), the following conditions need to be met.

$S_{min} \leq L_1 \leq S_{max}$ $L_2$ falls within the 95% prediction interval based on $L_1$ of rhythm ABA.

FIG. 3 illustrates the results of regression analysis of $L_1$ and $L_2$ for rhythm ABA. The horizontal axis of the graph represents $L_1$ (the time between tap A and the next tap B), and the vertical axis represents $L_2$ (the time between tap B and the next tap A). Letting $L_1=x$, and $L_2=y$, then the following equations hold.

$y=0.9152x+37.269$ $R^2=0.8916$

Likewise, performing regression analysis on other rhythms yields the following equations.

Rhythm AAB:

$$L_2=1.03L_1-7.1$$

Rhythm ABB:

$$L_2=0.85L_1+43.7$$

rhythm ABAB:

$$L_2=0.96L_1+14.1, L_3=0.95L_1+10.6$$

Rhythm AB-A:

$$L_2=1.54L_1+183.0$$

Rhythm AB-B:

$$L_2=1.48L_1+195.9$$

Rhythm AB-C:

$$L_2=1.45L_1+207.9$$

Rhythm ABABA:

$$L_2=0.93L_1+22.5, L_3=0.97L_1-0.5, L_4=0.92L_1+36.4$$

Rhythm ABA-A:

$$L_2=0.97L_1+28.0, L_3=1.54L_1+166.5$$

Rhythm ABA-C:

$$L_2=0.95L_1+34.1, L_3=1.44L_1+170.0$$

Rhythm AB-AB:

$$L_2=1.59L_1+146.5, L_3=0.95L_1+0.3$$

$L_3$ for rhythm ABAB means, with the time from the first tap A to the next tap B taken as $L_1$, and the time from this tap B to the next tap A taken as $L_2$, the time $L_3$ from this tap A to the last tap B. Likewise, $L_4$ for rhythm ABABA means the time from the second tap B to the last tap A. Generally, the time between the i-th tap and the (i+1)-th tap can be expressed as Li.

The 95% prediction interval for each of $L_2$, $L_3$, and $L_4$ based on $L_1$ is $$y'-t(n-p-1,0.975)*SE \leq y \leq y'+t(n-p-1,0.975)*SE,$$

where y' is a predicted value of y, which is calculated from the results of regression analysis obtained for each of the above-mentioned rhythms. SE denotes the standard deviation obtained by the regression analysis. t(n−p−1, 0.975) denotes the 0.975 percentile (a numerical value indicating the ordinal position counted from bottom in the whole taken as 100) of the t-distribution with (n−p−1) degrees of freedom, n denotes the sample size of the observation data, and p denotes the number of explanatory variables, which is 1 in this case.

Figure 4:
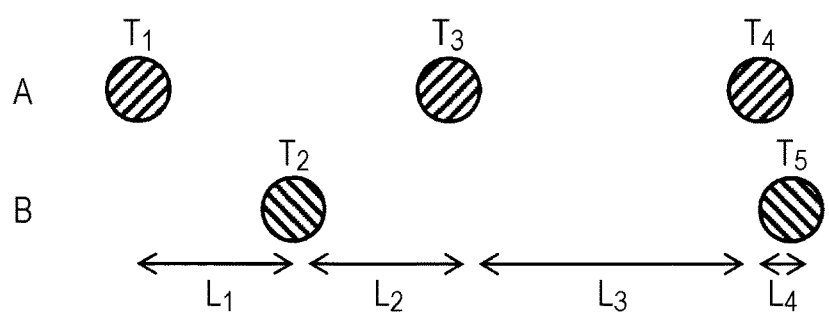
FIG. 4 schematically illustrates rhythm ABA-C.

Now, rhythm ABA-C will be described as an example. FIG. 4 schematically illustrates a tap sequence $T_1$, $T_2$, $T_3$, $T_4$, $T_5$. First, a user performs tap $T_1$ with the dominant hand, then tap $T_2$ with the non-dominant hand after $T_1$, then tap $T_3$ with the dominant hand after $L_2$, and lastly, taps $T_4$ and $T_5$ with both hands after $L_3$. The time difference when taps $T_4$ and $T_5$ are performed with both hands is designated $L_4$. For the sequence of these taps $T_1$, $T_2$, $T_3$, $T_4$, and $T_5$ to be determined as rhythm ABA-C, the following criteria need to be met.

Criterion 1: Device Validity $$\text{device }(T_1) \neq \text{device }(T_2)$$

$$\text{device }(T_1) = \text{device }(T_3)$$

$$\text{device }(T_4) \neq \text{device }(T_5)$$

and $$\text{device }(T_1) = \text{device }(T_4), \text{ or device }(T_1) = \text{device }(T_5)$$

Criterion 2: Validity of a First Interval $$S_{min} \leq L_1 \leq S_{max}$$

Criterion 3: Validity of a Second Interval

Letting the 95% prediction interval for $L_2$ based on $L_1$ of rhythm ABA-C be [$min_2$, $max_2$], tap $T_3$ falls within the interval [$T_2+min_2$, $T_2+max_2$].

Criterion 4: Validity of a Third Interval

Letting the 95% prediction interval for $L_3$ based on $L_1$ of rhythm ABA-C be [$min_3$, $max_3$], tap $T_4$ falls within the interval [$T_3+min_3$, $T_3+max_3$].

Criterion 5: Validity of a Fourth Interval

This represents the validity of simultaneous taps, which is expressed as follows.

$$0 \leq L_4 \leq D_{max}$$

The above criteria are used in determining a given tap sequence to be a specific rhythm. If multiple rhythms include a particular rhythm that can be easily determined, in other words, a particular rhythm that is unlikely to be erroneously detected, then such a rhythm can be selected as a rhythm that serves as a trigger for performing transmission and reception of data between multiple data communication devices.

FIG. 5 illustrates the frequency of erroneous detections of each rhythm for a case where the number of users (persons) is varied as 1, 5, 10, and 20, and each device is tapped so as to achieve each rhythm. FIG. 5 illustrates the total number of erroneous detections for five days. For example, when the number of users is 10, the total numbers of erroneous detections for individual rhythms are as follows.

ABAB→1
AB-C→0
ABABA→0
ABA-A→0
ABA-C→0
AB-AB→1

It can be appreciated form the above results that these rhythms can be determined with almost complete reliability and accuracy. Therefore, these rhythms may be used to reliably and accurately establish transmission and reception of data between data communication devices. Generally, use of four or more taps enables a marked decrease in the frequency of erroneous detection.

As described above, rhythms with relatively low risks of erroneous detection are selected, and the selected rhythms are used to permit communication of data between multiple devices.

Multiple devices may be used by the same user, or each device may be used by a different user. In the former case, the same person has multiple (e.g., two) devices, and the person taps one of the devices with the dominant hand and taps the other device with the non-dominant hand to permit communication of data between two devices. In the latter case, each user taps the user's own device with the dominant hand or the non-dominant hand to permit communication of data between multiple devices.

Next, the exemplary embodiments will be described with greater specificity.

First Exemplary Embodiment

Figure 6:
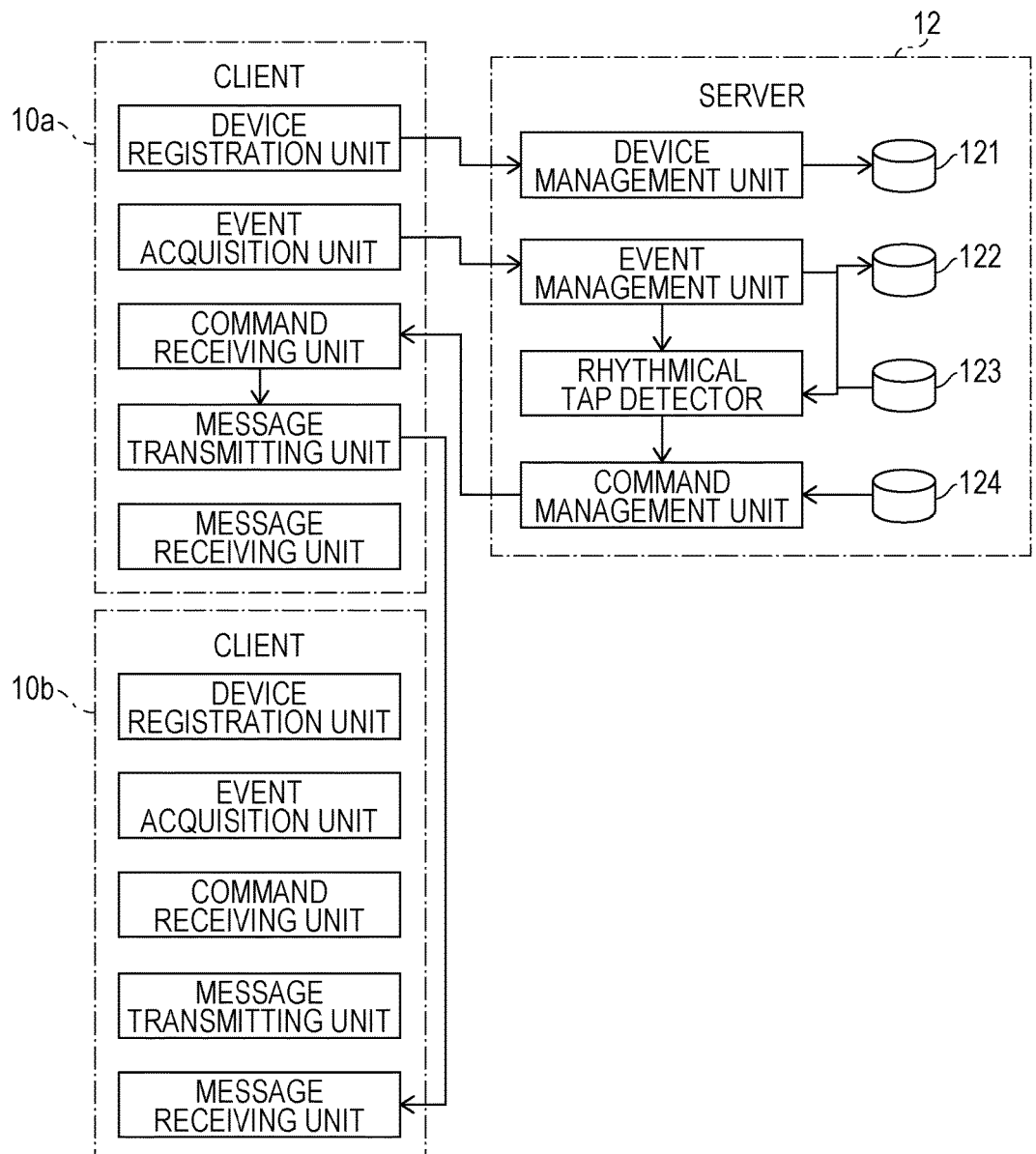
FIG. 6 illustrates a system configuration according to a first exemplary embodiment.

FIG. 6 illustrates a system configuration according to a first exemplary embodiment. The system is a server-client system. Two client terminals (to be referred to as "clients" hereinafter) 10a and 10b are connected to a server 12 via a communication line. The client 10a, which is an information processing device, functions as a first terminal, and the client 10b, which is an information processing device, functions as a second terminal. The server 12 functions as an information management device.

The clients 10a and 10b each include a device registration unit, an event acquisition unit, a command receiving unit, a message transmitting unit, and a message receiving unit.

The device registration unit acquires, based on an instruction from a user, the device name and device ID of a client device, and transmits the acquired device name and device ID to the server 12.

The event acquisition unit functions as an input unit that receives an input. The event acquisition unit acquires an input (event) that has occurred on a client, and transmits the corresponding device ID and event type to the server 12. An input according to the exemplary embodiment is a tap, and the event acquisition unit may be specifically implemented by a touch panel.

The command receiving unit receives a command from a command management unit of the server 12, and transmits a message corresponding to the command to a destination device (client).

The message transmitting unit generates a message and transmits the message to a destination device (client), based on an instruction from the command receiving unit.

The message receiving unit receives a message from another device (client), and executes a process corresponding to the received message.

The server 12 includes a device management unit, an event management unit, a rhythmical tap detector, and a command management unit. The server 12 also includes the following databases (DBs): a device table DB 121, an event table DB 122, a rhythm table DB 123, and a command table DB 124.

The device management unit registers, into the device table DB 121, a device name and a device ID transmitted from the device registration unit of each of the clients 10a and 10b.

The event management unit registers, into the event table DB 122, a device ID and event time transmitted from the event acquisition unit of each of the clients 10a and 10b.

The rhythmical tap detector detects a rhythmical tap by determining, whenever a new event is added to the event table DB 122, whether a new rhythmical tap has occurred. The rhythmical tap detector detects a rhythmical tap by referencing a rhythm table stored in the rhythm table DB 123 and determining the validity of intervals in the tap sequence.

The command management unit functions as a permitting unit that permits communication of data between clients. In response to detection of a rhythmical tap by the rhythmical tap detector, the command management unit transmits, to each of the clients 10a and 10b, a command instructing that a message be transmitted. The type of the command to be transmitted varies for each rhythm. Thus, the command management unit references a command table stored in the command table DB 124 to transmit a command instruction corresponding to the detected rhythmical tap.

Hereinafter, processes executed by various units will be described in detail.

The device management unit of the server 12 registers device names and device IDs received from the respective device registration units of the clients 10a and 10b into the device table DB 121. In its simplest form, the information registered at this time is a list of device IDs. Specifically, the list contains information such as ID=1→client 10a, ID=2→client 10b, and so on.

There are several methods for registering devices. For example, devices to be registered may be specified via a dialog or as files. Alternatively, when a meeting is to be conducted by multiple clients, device registration may be performed simultaneously with user registration by a method such as holding an NFC device over the devices to be registered at the beginning of the meeting. At this time, it is desired that the registration of devices be valid only for the duration of the meeting, and be cancelled after the meeting ends.

Upon detecting the occurrence of an event on the client 10a or 10b, the event management unit of the server 12 registers the corresponding device ID and event type, and the time of receipt of the event into the event table DB 122. The following is an example of a device ID and an event type transmitted from the event acquisition unit of the client 10a or 10b.

Device: 2
Event: press

Figures 7, 8:
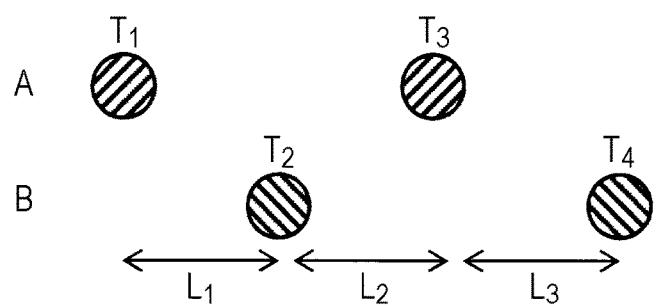
FIG. 7 illustrates an event table.
FIG. 8 schematically illustrates rhythm ABAB.

FIG. 7 illustrates an example of an event table registered in the event table DB 122. Event ID, time of receipt, device ID, and event type are registered in the event table in association with each other. It is assumed that there is no delay in communication between each of the clients 10a and 10b and the server 12, and the time of event occurrence on each of the clients 10a and 10b is ignored. Of course, both the time of event occurrence and the time of event receipt may be registered in the event table DB 122.

The rhythmical tap detector of the server 12 uses event sequences, that is, tap sequences registered in the event table DB 122 to detect a specific rhythm. An algorithm for rhythmical tap detection will be described below by way of several rhythms as examples.

Detection of Rhythm ABAB

FIG. 8 schematically illustrates a case where taps have been performed on each of the clients 10a and 10b. In FIG. 8, "A" represents tapping on the client 10a, and "B" represents tapping on the client 10b. This corresponds to a case where, first, tap $T_1$ is performed on the client 10a, followed by tap $T_2$ on the client 10b, followed by tap $T_3$ on the client 10a, and then followed by tap $T_4$ on the client 10b. The time between tap $T_1$ and tap $T_2$ is designated $L_1$, the time between tap $T_2$ and tap $T_3$ is designated $L_2$, and the time between tap $T_3$ and tap $T_4$ is designated $L_3$.

To determine whether the sequence of these taps, $T_1$, $T_2$, $T_3$, and $T_4$, constitutes rhythmical tap ABAB, it is determined whether the following criteria are met.

Criterion 1: Device Validity $$\text{device}(T_1) \neq \text{device}(T_2)$$

$$\text{device}(T_1) = \text{device}(T_3)$$

$$\text{device}(T_2) = \text{device}(T_4)$$

Criterion 2: Validity of a First Interval $$S_{min} \leq L_1 \leq S_{max}$$

Criterion 3: Validity of a Second Interval

Letting the 95% prediction interval for $L_2$ based on $L_1$ of rhythm ABAB be [$min_2$, $max_2$], $T_3$ falls within the interval [$T_2 + min_2$, $T_2 + max_2$].

Criterion 4: Validity of a Third Interval

Letting the 95% prediction interval for $L_3$ based on $L_1$ of rhythm ABAB be [$min_3$, $max_3$], $T_4$ falls within the interval [$T_3 + min_3$, $T_3 + max_3$].

In this case, $S_{min}$, $S_{max}$, $min_2$, $max_2$, $min_3$, and $max_3$ are registered in the rhythm table DB 123 in advance. Alternatively, these values may be calculated from $L_1$ by using the results of regression analysis.

FIG. 9 illustrates an example of a rhythm table stored in the rhythm table DB 123. For each rhythm, the gradient, intercept, and the values of "t" and "SE" of the results of regression analysis (linear regression) are registered in the rhythm table in association with each other. These parameters are necessary for calculating, for each rhythm, the lower and upper limits of the 95% prediction interval for each of $L_2$, $L_3$, and $L_4$ based on $L_1$. For example, the lower limit $min_2$ and upper limit $max_2$ of the 95% prediction interval for $L_2$ for rhythm ABA are calculated follows.

$$min_2 = 0.91*L_1 + 37.2 - 1.96*1676$$

$$max_2 = 0.91*L_1 * 37.2 + 1.96*1676$$

For rhythm ABA-C, the fourth tap is a simultaneous tap on each of the clients 10a and 10b. In this case, all values are registered as zero for the sake of convenience.

The detection algorithm used is as follows.

A set of valid tap subsequences of ABAB is designated $R^{ABAB}$. A valid tap subsequence refers to a tap subsequence that satisfies both the device validity and interval validity conditions.

When tap T occurs, for all of the elements r of $R^{ABAB}$, when r=1 ($r=T_1$), and when $S_{min} \leq T-T_1 (=L_1) \leq S_{max}$, if device ($T_1$)≠device (T), then r is replaced by $T_1T$. When $S_{max} < T-T_1 (=L_1)$, r is removed from $R^{ABAB}$.

When r=2 ($r=T_1T_2$), and when $min_2 \leq T-T_2 (=L_2) < max_2$, if device ($T_1$)=device (T), then r is replaced by $T_1T_2T$. When $max_2 < T-T_2$, r is removed from $R^{ABAB}$.

When r=3 ($r=T_1T_2T_3$), and when $min_3 \leq T-T_3 (=L_3) \leq max_3$, if device ($T_2$)=device (T), $T_1T_2T_3T$ is determined to be a rhythmical tap. When $max_3 < T-T_3$, r is removed from $R^{ABAB}$.

The above process is repeatedly executed for all of the elements r to determine whether the tap sequence $T_1$, $T_2$, $T_3$, $T_4$ constitutes rhythm ABAB.

Detection of Rhythm AB-C

Figure 10:
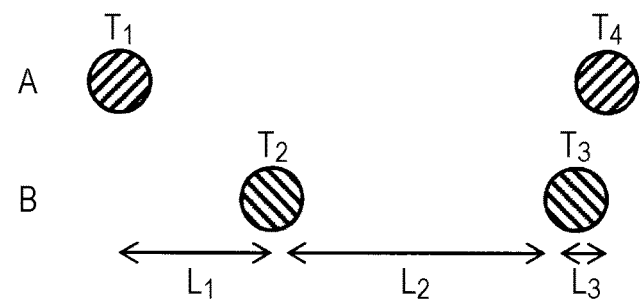
FIG. 10 schematically illustrates rhythm AB-C.

FIG. 10 schematically illustrates a case where taps have been performed on each of the clients 10a and 10b. In FIG. 10, "A" represents tapping on the client 10a, and "B" represents tapping on the client 10b. This corresponds to a case where tap $T_1$ is performed on the client 10a, followed by tap $T_2$ on the client 10b, which is then followed by taps $T_3$ and $T_4$ performed substantially simultaneously on the client 10b and the client 10a, respectively. The time between tap $T_1$ and tap $T_2$ is designated $L_1$, the time between tap $T_2$ and tap $T_3$ is designated $L_2$, and the time between tap $T_3$ and tap $T_4$ is designated $L_3$.

To determine whether the sequence of these taps $T_1$, $T_2$, $T_3$, and $T_4$ constitutes rhythmical tap AB-C, it is determined whether the following criteria are met.

Criterion 1: Device Validity device ($T_1$)≠device ($T_2$)

device ($T_3$)≠device ($T_4$)

and, device ($T_1$)=device ($T_3$), or device ($T_1$)=device ($T_4$)

Criterion 2: Validity of a First Interval $S_{min} \leq L_1 \leq S_{max}$

Criterion 3: Validity of a Second Interval

Letting the 95% prediction interval for $L_2$ based on $L_1$ of rhythm AB-C be [$min_2$, $max_2$], $T_3$ falls within the interval [$T_2+min_2$, $T_2+max_2$].

Criterion 4: Validity of a Third Interval $0 \leq L_3 \leq D_{max}$ $S_{min}$, $S_{max}$, $min_2$, $max_2$, and $D_{max}$ are registered in the rhythm table DB 123 in advance. Alternatively, these values may be calculated from $L_1$ by using the results of regression analysis.

The detection algorithm used is as follows.

When r=1 ($r=T_1$), and when $S_{min} \leq T-T_1 (=L_1) \leq S_{max}$, if device ($T_1$)≠device (T), then r is replaced by $T_1T$. When $S_{max} < T-T_1 (=L_1)$, r is removed from $R^{ABAB}$.

When r=2 ($r=T_1T_2$), and when $min_2 \leq T-T_2 (=L_2)$ $max_2$, if device ($T_1$)=device (T), or device ($T_2$)=device (T), then r is replaced by $T_1T_2T$. When $max_2 < T-T_2$, r is removed from $R^{ABAB}$.

When r=3 ($r=T_1T_2T_3$), and when $0 \leq T-T_3 \leq D_{max}$, if device ($T_1$)=device (T), or device ($T_2$)=device (T), then $T_1T_2T_3T$ is determined to be a rhythmical tap. When $D_{max} < T-T_3$, r is removed from $R^{ABAB}$.

The above process is repeatedly executed for all of the elements r to determine whether the tap sequence $T_1$, $T_2$, $T_3$, $T_4$ constitutes rhythm AB-C.

Situations can arise in which multiple rhythmical taps are detected simultaneously. An example of such a situation is when rhythm ABA and rhythm ABABA are detected. Which rhythm is to be given priority in such a case may be determined in advance. For example, priority is given to the longer of the two rhythms. This is because the probability of occurrence of the longer rhythm is lower, and thus use of such a rhythm ensures a corresponding improvement in reliability.

Figure 11:
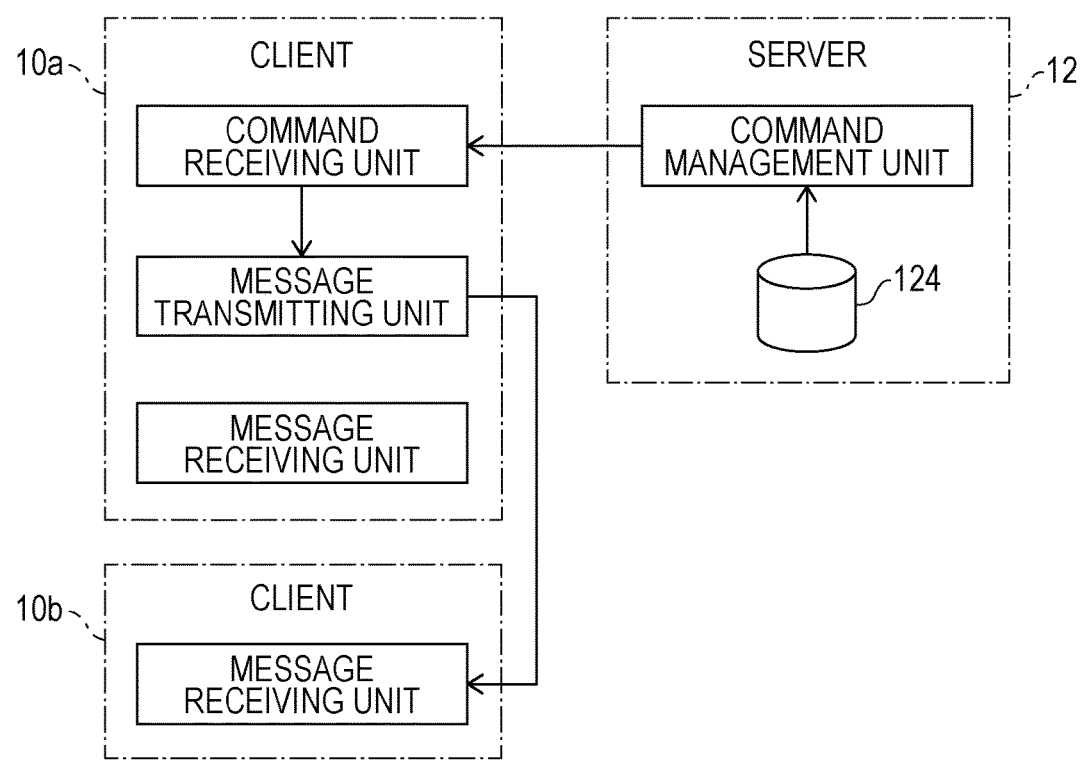
FIG. 11 illustrates a process performed after rhythm detection.

FIG. 11 is a schematic representation of a process performed upon detection of a specific rhythm. In response to detection of a rhythmical tap by the rhythmical tap detector of the server 12, the command management unit reads a command corresponding to the detected rhythmical tap from the command table DB 124. The command management unit transmits the read command (the command corresponding to the detected rhythm) to the command receiving unit of the client 10a. The message transmitting unit of the client 10a transmits a message to the client 10b. The message receiving unit of the client 10b executes a process according to the received message.

Figures 12, 13:
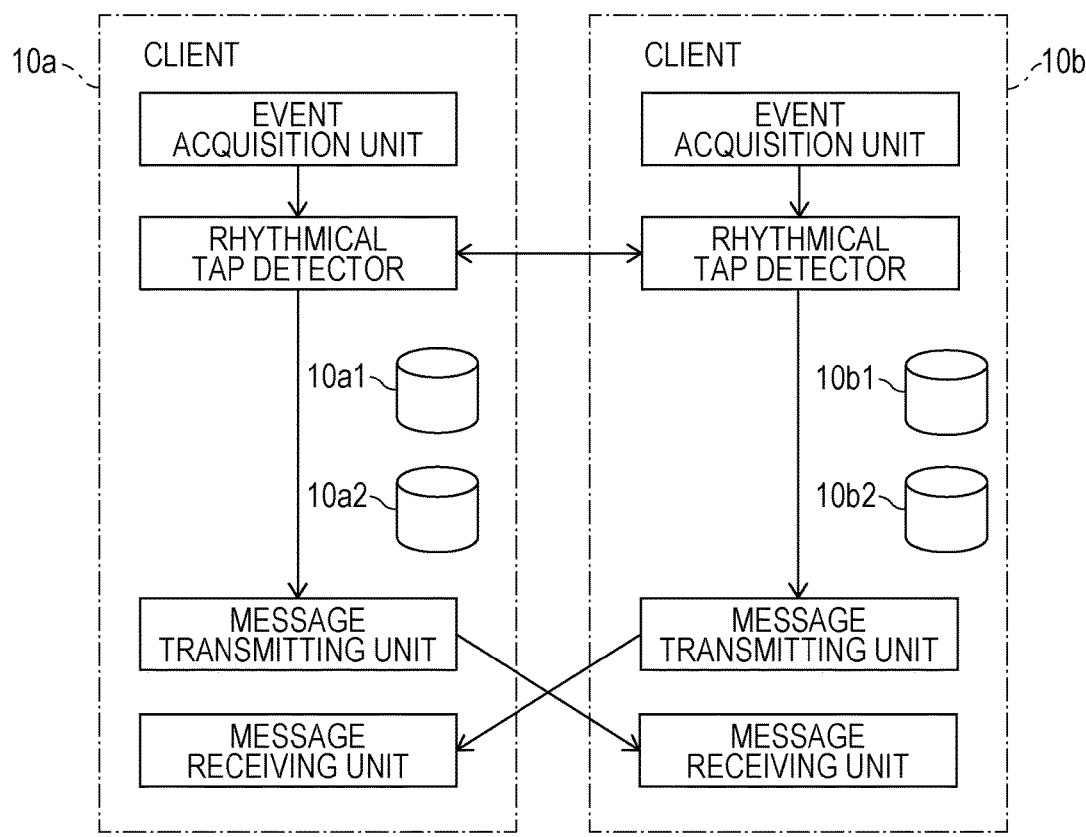
FIG. 12 illustrates a command table.
FIG. 13 illustrates a system configuration according to a second exemplary embodiment.

FIG. 12 illustrates an example of a command table registered in the command table DB 124. Rhythms and commands are stored in the command table in association with each other. The following is an example of rhythms and commands stored in the command table.

Rhythm ABA: TextSend

Rhythm AAB: FileSend

A command in this case is a command to be executed between the clients 10a and 10b for which a rhythm has been detected. Such a command is transmitted to the client that has executed the first tap $T_1$ of the detected rhythm.

For example, if rhythm AAB is detected, the corresponding command is FileSend (transmission of an active file). In this case, since the first tap $T_1$ has been executed by the client 10a, the command management unit transmits, to the client 10a, a command instructing the client 10a to "transmit a file to the client 10b". A FileSend command is a command that means transmission of an active file. The destination of the active file in this case is specified to be the client 10b, which is the device on which tap $T_3$ corresponding to tap B has been performed.

At the client 10a, the command receiving unit receives the command from the server 12, and the message transmitting unit transmits a message and a file to the client 10b. At the client 10b, the message receiving unit receives the message, and executes a process according to the type of the received message. For example, the received file is displayed on the display of the client 10b.

If a rhythmical tap is to be detected for multiple types of rhythms, basically, different algorithms are executed in a simultaneous parallel fashion for each type of rhythm. This is because the determination criteria or parameters used differ for each rhythm. For example, a case is considered in which three types of rhythms, ABA, ABB, and ABAB, are to be detected. In this case, when the server 12 receives the event of tap T from the client 10a or 10b, all of the detection algorithms for the three types of rhythms ABA, ABB, and ABAB are executed in a parallel fashion. At this time, it is possible that rhythmical taps corresponding to different rhythms are detected at the same time. Thus, as mentioned above, it is desirable to determine which detection algorithm is to be given priority in advance. Detection algorithms may be executed in the order of their priority rank, and at the time when a rhythmical tap is detected, rhythmical tap detection for tap T may be ended.

There is also a possibility that different rhythms beginning with the same tap may be detected. This corresponds to detection of, for example, ABA and ABAB. ABAB corresponds to an extension of ABA. For cases where priority is given to detection of longer tap sequences, detection of ABA is not to be immediately taken to mean that ABA has been detected. For such cases, after ABA is detected, it needs to be waited for a while until it is confirmed that ABAB is not detected, only after which it is determined that ABA has been detected. In other words, the tapped sequence is determined to be ABA by the fact that ABAB has not been detected. In an alternative configuration, at the point when ABA is detected, ABA is provisionally determined to be the tapped sequence, and if ABAB is not detected thereafter, then ABA is finally determined to be the tapped sequence.

Second Exemplary Embodiment

FIG. 13 illustrates a system configuration according to a second exemplary embodiment. The system is of a peer-to-peer (P2P) configuration in which two clients 10a and 10b communicate with each other. The clients 10a and 10b both function as information processing devices.

The clients 10a and 10b each include an event acquisition unit, a rhythmical tap determining unit, a message transmitting unit, and a message receiving unit, and also includes, as databases (DBs), a rhythm table DB and a command table DB. In FIG. 13, the rhythm table DB and the command table DB of the client 10a are respectively designated as a rhythm table DB 10a1 and a command table DB 10a2, and the rhythm table DB and the command table DB of the client 10b are respectively designated as a rhythm table DB 10b1 and a command table DB 10b2.

The event acquisition unit of each of the clients 10a and 10b acquires an event that has occurred on the client 10a or 10b, and broadcasts an event message to the other client.

The rhythmical tap determining unit of each of the clients 10a and 10b determines, for each of multiple valid event messages, whether to continue/accept/reject a rhythmical tap determination. The rhythm tables DB 10a1 and 10b1 are referenced for the determination.

If the determination result is "continue", the rhythmical tap determining unit transmits the event message to the corresponding client.

If the determination result is "accept", the rhythmical tap determining unit references the command table DB 10a2 or 10b2, and requests the message transmitting unit to transmit the corresponding command to the corresponding client.

If the determination result is "reject", the rhythmical tap determining unit terminates exchanging of event messages with the other client.

The message transmitting unit of each of the clients 10a and 10b generates a message based on a command, and transmits the message to the destination client.

The message receiving unit of each of the clients 10a and 10b receives a message from the other client, and executes a process according to the received message.

Although the function of the event acquisition unit is basically the same as that in the first exemplary embodiment, it is to be noted that unlike in the first exemplary embodiment, the event acquisition unit broadcasts an event message to all other clients, rather than transmitting the event message to the server 12. Accordingly, if, for example, there are clients 10c, 10d, and so on in addition to the clients 10a and 10b, the event acquisition unit of the client 10a transmits an acquired event to all of the other clients 10b, 10c, 10d, and so on.

FIG. 14 illustrates the data structure of an event message broadcast between clients.

SubSequence represents a rhythmical tap subsequence, and means that the subsequence up to that position satisfies device validity and interval validity. That is, Subsequence refers to such a tap sequence that can possibly form a rhythmical tap with addition of a sequence of several more taps. Candidates represent a set of rhythm candidates that a tap subsequence satisfies. Although a large number of rhythm candidates can initially exist, the set of tap subsequences is narrowed down as the tap subsequence becomes longer.

Although FirstInterval may be calculated as $T_2-T_1$, there is a possibility of clocks not being synchronized between different clients. Accordingly, the time difference between taps on the same client, or the difference between the time of tapping and the time of arrival at device ($T_2$) is used as the length of a first interval.

The ArrivalTime field, which is blank at the time of transmission of an event message, records the time of arrival of the message at the receiving end of the message.

Figure 15:
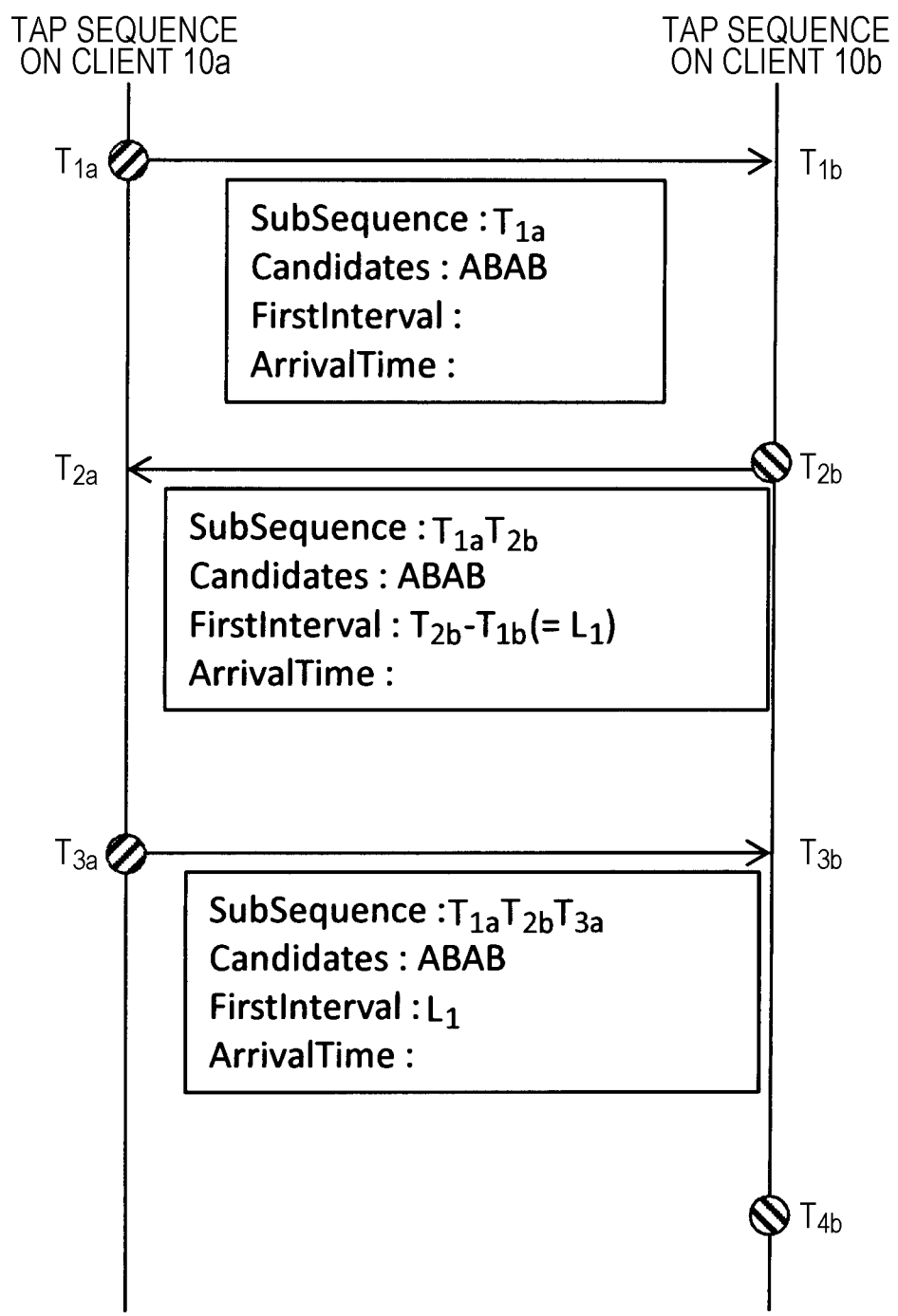
FIG. 15 is a sequence diagram according to the second exemplary embodiment.

FIG. 15 is a sequence diagram illustrating exchange of event messages between clients, with rhythm ABAB taken as an example.

A tap sequence on the client 10a is designated $T_{1a}$, $T_{3a}$, and a tap sequence on the client 10b is designated $T_{2b}$, $T_{4b}$. When tap $T_{1a}$ is detected at time $T_{1a}$, the event acquisition unit of the client 10a detects this event, and broadcasts the following event message to the other client.

SubSequence: $T_{1a}$
Candidates: ABAB
First Interval:
ArrivalTime:

Since the second exemplary embodiment assumes the existence of the clients 10a and 10b, the event acquisition unit of the client 10a transmits the event message to the client 10b. It is assumed that the event message arrives at the client 10b at time $T_{1b}$.

Next, when tap $T_{2b}$ is detected at time $T_{2b}$, the event acquisition unit of the client 10b detects this event, and broadcasts the following event message to the other client.
SubSequence: $T_{1a}T_{2b}$
Candidates: ABAB
FirstInterval: $T_{2b}-T_{1b}(=L_1)$
ArrivalTime:

In the second exemplary embodiment, the event message is transmitted to the client 10a. At this time, the rhythmical tap determining unit of the client 10b calculates $T_{2b}-T_{1b}$, and if this falls within the interval $[S_{min}, S_{max}]$, the rhythmical tap determining unit determines to "continue" and transmits the event message to the client 10a. If multiple potential rhythm candidates exist, all of such rhythm candidates are transmitted. It is assumed that the event message arrives at the client 10a at time $T_{2a}$.

Next, when tap $T_{3a}$ is detected at time $T_{3a}$, the event acquisition unit of the client 10a detects this event, and broadcasts the following event message to the client 10b.
SubSequence: $T_{1a}T_{2b}T_{3a}$
Candidates: ABAB
FirstInterval: $L_1$
ArrivalTime:

At this time, the rhythmical tap determining unit of the client 10a calculates $T_{3a}-T_{2b}$, and if this falls within the interval $[min_2, max_2]$, and device $(T_{1a})$=device $(T_{3a})$, the rhythmical tap determining unit determines to "continue", and transmits the event message to the client 10b. It is assumed that the event message arrives at the client 10b at time $T_{3b}$.

Next, when tap $T_{4b}$ is detected at time $T_{4b}$, the event acquisition unit of the client 10b detects this event. Further, the rhythmical tap determining unit of the client 10b calculates $T_{4b}-T_{3b}$, and if this falls within the interval $[min_3, max_3]$, and device $(T_{1a})$=device $(T_{4a})$, the rhythmical tap determining unit detects rhythmical tap ABAB, and determines to "accept". The rhythmical tap determining unit of the client 10b references the command table DB 10b2, and requests the message transmitting unit to transmit the corresponding command to the client 10a. The message receiving unit of the client 10a receives the command from the client 10b, and executes the corresponding process. Examples of such a corresponding process include transmission of a file to the client 10b.

A detailed description of the algorithm used by the rhythmical tap determining unit will be given below.

Immediately following receipt of event message E by a client, the time of arrival of the event message is recorded into the ArrivalTime field for event message E.

If an event, for example, a Press event has occurred on the client, the following process is executed for each of event messages retained by the client.

When SubSequence of the event message has a length of 1 ($T_1$), letting the time of arrival of $T_1$ be $T_1^*$, if $S_{min} \leq T-T_1^* \leq S_{max}$, then SubSequence of event message E is substituted by $T_1T$. FirstInterval is set to $T-T_1^*$. Further, the event message is transmitted to the client of device $(T_1)$. When $S_{max} < T-T_1^*$, the event message is removed from the set of event messages.

When SubSequence of the event message has a length of 2 ($T_1T_2$), the time of arrival of $T_2$ is designated $T_2^*$. Letting FirstInterval of the event message be $L_1$, when $min_2 \leq T-T_2^* \leq max_2$, and device $(T_1)$=device (T), SubSequence of the event message is substituted by $T_1T_2T$. Further, the event message is transmitted to the client of device $(T_2)$. When $S_{max} < T-T_2^*$, the event message is removed from the set of event messages.

When SubSequence of the event message has a length of 3 ($T_1T_2T_3$), the time of arrival of $T_3$ is designated $T_3^*$. Letting FirstInterval of the event message be $L_1$, when $min_3 \leq T-T_3^* \leq max_3$, and device $(T_2)$=device (T), a rhythmical tap $T_1T_2T_3$ is detected. When $S_{max} < T-T_2^*$, the event message is removed from the set of event messages.

As described above, according to the second exemplary embodiment, it is not necessary to synchronize time between multiple clients. It is not necessary for each client to transmit time data, either. It is to be noted, however, that transmitting time data provides an advantage of enabling precise interval estimation because a communication delay can be calculated upon return of an event.

The second exemplary embodiment does not involve centralized management via the server 12. Accordingly, information such as knowledge about rhythms and the interval estimation method for each individual rhythm needs to be retained by each client. Further, when a change is to be made to the algorithm, this is not achieved simply by upgrading the version of the server 12 but requires the software of all clients to be changed.

Third Exemplary Embodiment

The peer-to-peer configuration according to the second exemplary embodiment is designed such that, for each event, an event message is broadcast to all the other clients. This can lead to increases in network traffic.

To avoid such increases in network traffic, the third exemplary embodiment employs the following configuration. That is, only after a certain amount of event sequence accumulates, the event sequence is broadcast to other clients. Then, each receiving client that has received the transmitted event sequence checks an event sequence retained by the receiving client against the transmitted event sequence to determine whether the combination of the transmitted event sequence and the event sequence retained by the receiving client constitutes a rhythmical tap as a whole. Rather than broadcasting a message for each single event, an event sequence made up of multiple events is transmitted, thus reducing network traffic. Further, rather than transmitting a message upon every occurrence of an event, a message is transmitted only when a sequence of events satisfies a certain condition, thus reducing network traffic.

Figures 16, 17:
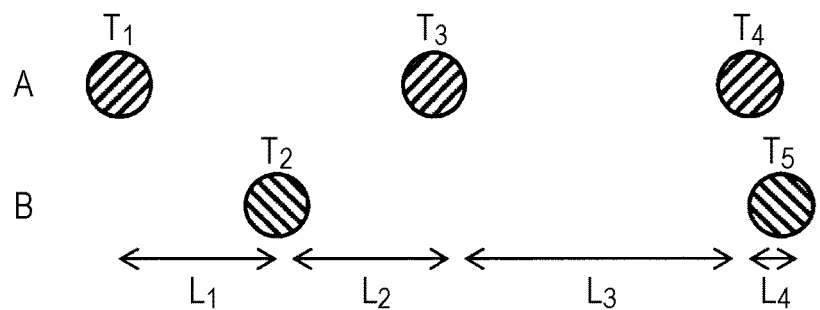
FIG. 16 schematically illustrates rhythm ABA-C.
FIG. 17 illustrates an event table.

FIG. 16 schematically illustrates an example of tap sequences on the clients 10a and 10b. This corresponds to rhythmical tap ABA-C, and it is assumed that a tap sequence $T_1$, $T_3$, $T_4$ has occurred on the client 10a, and a tap sequence $T_2$, $T_5$ has occurred on the client 10b.

Hereinafter, of the sequence of taps constituting a rhythmical tap, the subsequence that occurs on the client 10a (the client that is tapped earlier) will be referred to as "leading-half subsequence" ($T_1T_3T_4$), and the subsequence that occurs on the client 10b (the client that is tapped later) will be referred to as "trailing-half subsequence" ($T_2T_5$).

If an event sequence that has occurred on a given client is identified to be the leading-half subsequence (if the interval width of the tap sequence is likely to be that of the leading-half subsequence of a specific rhythm), the client broadcasts the leading-half subsequence to the other clients. The client that has received the leading-half subsequence determines whether the transmitted tap sequence constitutes a rhythmical tap when combined with a tap sequence retained by the receiving client.

Although the system configuration according to the third exemplary embodiment is substantially the same as that according to the second exemplary embodiment, in the third exemplary embodiment, each client further includes an event retaining unit and a subsequence determining unit.

As in the second exemplary embodiment, the event acquisition unit acquires an event that has occurred on a client, and broadcasts the acquired event to the other clients.

The event retaining unit retains the event for a predetermined period of time.

The subsequence determining unit searches event sequences in the event table for the leading-half subsequence of a specific rhythm. If such a leading-half subsequence is found, the subsequence determining unit broadcasts the leading-half subsequence to the other clients.

When the rhythmical tap determining unit of a client receives a leading-half subsequence from another client, the rhythmical tap determining unit checks the leading-half subsequence against each event sequence in the event table retained by the receiving client to determine whether the combination of the leading-half subsequence and the event sequence constitutes a rhythmical tap. If a rhythmical tap is detected, the rhythmical tap determining unit references the command table DB $10a2$ or $10b2$, and requests the message transmitting unit to transmit the corresponding command to the corresponding client.

FIG. 17 illustrates an example of an event table retained by the event retaining unit. In the event table, event ID and time are stored in association with each other. Each event acquired by the event acquisition unit is sequentially stored into the event table. Any event for which a predetermined time $T_{max}$ has elapsed since its storage is removed from the table, because even if retained any longer, such an event does not become to form a leading-half subsequence, nor does such an event form a rhythmical tap even when combined with a transmitted leading-half subsequence. $T_{max}$ is calculated as follows.

That is, first, the maximum value of $S_{max}$ is selected for the first interval. Next, with this taken as $L_1$, the maximum estimated value of $L_2$ is selected. In this way, the maximum values of $L_3$ and $L_4$ are also selected one after the other, and the sum of all of these values for the maximum number of taps is determined to be $T_{max}$.

Figures 18, 19:
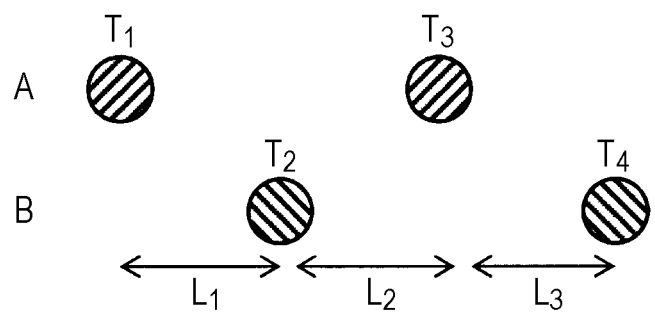
FIG. 18 schematically illustrates rhythm ABAB.
FIG. 19 illustrates an event message.

FIGS. 18 and 19 each schematically illustrate a process executed by the subsequence determining unit. Now, suppose that rhythmical tap ABAB as illustrated in FIG. 18 exists.

It is necessary to determine whether taps $T_1$ and $T_3$ constitute a leading-half subsequence, only from taps $T_1$ and $T_3$ without the existence of taps $T_2$ and $T_4$. Since the length of $L_1$ is unknown, the timing of tap $T_3$ needs to be predicted while assuming both minimum and maximum values of $L_1$.

First, the minimum value $S_{min}$ of the 95% confidence interval for $L_2$ when $L_1$ is minimum is acquired. Next, the maximum value $S_{max}$ of the 95% confidence interval for $L_2$ when $L_1$ is maximum is acquired. Then, if tap $T_3$ falls within the interval $[T_1+S_{min}, T_1+S_{max}]$, it is determined that taps $T_1$ and $T_3$ have a possibility of constituting the leading-half subsequence of rhythm ABAB.

FIG. 19 illustrates an example of data transmitted by the subsequence determining unit. The subsequence determining unit transmits information such as type of rhythm (Rhythm), tap sequence (SubSequence), time of transmission (Time), and device (Device).

Rhythm ABAB is determined as described below.

First, for a given receiving client, the difference Diff between the time at the receiving client and the transmitting client is calculated, and this is used as the time difference between the system clocks of the receiving and transmitting clients.

Next, the event table of the receiving client is searched for event $T_2$ for which $T_2-T_1+$Diff falls within the interval $[S_{min}, S_{max}]$.

Next, $T_2-T_1+$Diff is set as $L_1$.

Next, with the 95% prediction interval for $L_2$ based on $L_1$ of rhythm ABAB set as $[min_2, max_2]$, it is determined whether $T_3+$Diff falls within the interval $[T_2+min_2, T_2+max_2]$.

Next, with the 95% prediction interval for $L_3$ based on $L_1$ of rhythm ABAB set as $[min_3, max_3]$, it is determined whether $T_4+$Diff falls within the interval $[T_3+min_3, T_3+max_3]$.

Since the subsequence determining unit detects a leading-half subsequence for each rhythm, there is a possibility that the leading-half subsequences of multiple rhythms may be detected from the same single tap sequence. In this case, as many leading-half subsequences as the number of detected rhythms may be broadcast to the other clients.

Lastly, the criteria for a tap sequence $T_1, T_2, T_3, T_4$ to be determined as rhythmical tap ABAB are as follows.

Criterion 1: Device Validity device $(T_1) \neq$ device $(T_2)$, device $(T_1)=$ device $(T_3)$, device $(T_2)=$ device $(T_4)$ Criterion 2: Validity of a First Interval $S_{min} \leq L_1 \leq S_{max}$ Criterion 3: Validity of a Second Interval Letting the 95% prediction interval for $L_2$ based on $L_1$ of rhythm ABAB be $[min_2, max_2]$, $T_3$ falls within the interval $[T_2+min_2, T_2+max_2]$.

Criterion 4: Validity of a Third Interval

Letting the 95% prediction interval for $L_3$ based on $L_1$ of rhythm ABAB be $[min_3, max_3]$, $T_4$ falls within the interval $[T_3+min_3, T_3+max_3]$.

Values such as $min_2$, $max_2$, $min_3$, or $max_3$ are calculated by referencing the rhythm table DB $10a1$ or $10b1$ to acquire necessary parameters, and using the value of $L_1$.

Clients according to the exemplary embodiments of the present invention described above may be any information terminals such as smartphones, tablet terminals, and personal computers. Further, the functional blocks of each client according to the exemplary embodiments are implemented by the CPU reading a process program stored in a program memory such as a ROM, an SSD, or an HD, and sequentially executing the program with a RAM used as a working memory. The same applies to the functional blocks of the server 12.

The following provides a list of major functions that the CPU of a server in a server-client system executes by means of a process program.

(1) The order and time intervals of three or more inputs made on multiple clients (terminals) are acquired.

(2) It is determined whether the acquired order and time intervals match a predetermined pattern.

(3) If a match occurs, a command corresponding to the predetermined pattern is transmitted between multiple clients so as to be executed.

Further, the following provides a list of major functions that the CPU of a client in a peer-to-peer system executes by means of a process program.

(1) When an input is made, the input is broadcast to the other clients.

(2) The order and time intervals of three or more inputs made on multiple clients (terminals) are acquired.

(3) It is determined whether the acquired order and time intervals match a predetermined pattern.

(4) If a match occurs, a command corresponding to the predetermined pattern is transmitted between multiple clients so as to be executed.

Some of the functions of a client may be implemented not by means of a software process based on execution of a program but by means of a hardware process. Such a hardware process may be performed by using, for example, a circuit such as an ASIC or a field-programmable array (FPGA).

The exemplary embodiments of the present invention mentioned above are not limitative but capable of various modifications. Such modifications will be described below.

Modification 1

The preceding description of the exemplary embodiments is directed to a case where pre-registration, or ad-hoc registration for a meeting or other occasions is performed to establish a group for transmitting and receiving data. The exemplary embodiments may be modified to allow various settings to be selected at this time as appropriate, such as use of a card reader, use of simultaneous tapping of a special rhythm, or use of both a card reader and simultaneous tapping of a special rhythm. Further, the network configuration to be employed may be any one of the followings: wired LAN (delay: 1 ms), wireless LAN (delay: 10 ms), and Bluetooth (registered trademark) (delay: 10 ms). As for the system clock, if the system time at each client and a network delay are managed by the server 12, it is not necessarily required to synchronize system clocks between clients.

Modification 2

The preceding description of the exemplary embodiments is directed to an example of a tap made up of a Press event and a Release event. Instead, a tap using the palm of the hand may be used as an input. The present inventors have confirmed that a tap using the palm of the hand further reduces erroneous detection.

Modification 3

In the exemplary embodiments, the validity of intervals such as the first interval and the second interval is determined to detect a rhythm. In this regard, the tolerance for interval fluctuations in determining interval validity may be made variable. Specifically, for example, the tolerance for fluctuations is set higher when the rhythm is fast (Fast) and when the rhythm is slow (Slow) than is otherwise the case. Specifically, with a typical standard speed as a reference speed, for rhythms faster than this speed and rhythms slower than this speed, the tolerance for fluctuations at the reference speed is increased. The determination of interval validity may be made by taking into account the possibility of reversions occurring in the tap sequence when the rhythm is fast. This is because when a user taps "AAB" very fast, the user may not notice even if "ABA" has been actually tapped.

The tolerance for interval fluctuations may be varied according to the user's age. For example, the tolerance for fluctuations is increased for users with relatively advanced age. As for the method of estimating user's age, if data such as user's age or date of birth is stored in the client, user's age may be estimated by using such data.

In one possible configuration, it may be previously specified on the system to increase the tolerance for fluctuations if multiple persons are to beat out a rhythm in a coordinated fashion. This includes, for example, setting the tolerance for fluctuations on the server 12 when ad-hoc registration is to be made for a meeting or other occasions in a server-client system. At this time, as the number of users increases, the tolerance for fluctuations may be increased accordingly.

Further, if a user fails to correctly beat out a rhythm and thus data transmission/reception fails, it is presumed that such a user will normally repeat the same operation, and hence the tolerance for fluctuations may be temporarily increased immediately following such a failure. Specifically, the tolerance for fluctuations is increased in accordance with the number of retries.

Modification 4

To further reduce erroneous operation, the exemplary embodiments may be modified not to permit one-to-one pairing of clients that are separated by a predetermined distance or more in a server-client system or a peer-to-peer system. For example, the distance between clients may be determined by, if each client includes a position detection module such as a GPS, using positional information detected by the module.

Modification 5

The exemplary embodiments may be modified to use the pressure, contact duration, or contact area of a Press operation in detecting a rhythm. If pressure is to be used, for example, tap A1 performed with a relatively strong pressure and tap A2 performed with a relatively weak pressure are set for tap A and, likewise, tap B1 performed with a relatively strong pressure and tap B2 performed with a relatively weak pressure are set for tap B, and data communication is permitted by use of rhythms of strong and weak beats such as follows:

A1B1A2
A1B2A1
A2B2A1

Whether the pressure applied is strong or weak may be detected by a pressure sensor.

If contact duration is to be used, for example, tap A1 as a relatively long tap (long press) and tap A2 as a relatively short tap are set for tap A and, likewise, tap B1 as a relatively long tap and tap B2 as a relatively short tap are set for tap B, and data communication is permitted by use of rhythms of long and short beats such as follows:

A1B1A2
A1B2A1
A2B2A1

Modification 6

The exemplary embodiments may be modified to learn individuals' habits, and customize criteria for each individual. This improves usability for each individual whose habits have been learned, and helps to prevent erroneous operation caused by intervention of other users.

Modification 7

With regard to the exemplary embodiments, due to cultural background, what rhythm is easier to tap than others is presumed to vary depending on the country or region. This fact may be utilized to select a rhythm that ensures a high level of security for each specific country, region, or cultural sphere.

For example, in Japan, some tap sequences, such as 3-3-7 beats (tan tan tan-tan tan tan-tan tan tan tan tan tan tan) or the rhythm of a particular famous video game (ja jan jan ja jan jan-ton), are familiar to many Japanese people despite the relatively large number of taps. For such tap sequences, the probability of such a long rhythm happening to occur at the same instant of time is presumably infinitesimally small, even when all devices in the world are considered. Accordingly, a temporary group is established by having multiple persons beat out such a rhythm. Such an action has a secondary advantage of possibly enhancing the sense of togetherness among the participants of a meeting as all the participants beat out such a rhythm together at the beginning of the meeting.

Modification 8

Generally, for longer rhythms, such as four-part rhythms as opposed to three-part rhythms and five-part rhythms as opposed to four-part rhythms, the probability of accidental occurrence of such rhythms is lower, which translates into relatively higher levels of security. This may be utilized so that commands for processing information of high relative importance are assigned to relatively long rhythms, and commands for processing information of low relative importance are assigned to relatively short rhythms. Specifically, in the command table stored in the command table DB 124 illustrated in FIG. 12, commands that vary in importance may be assigned in accordance with the relative length of each rhythm.

Modification 9

Although the preceding description of the exemplary embodiments is directed to a case where the operation (input) performed is a tap, instead of a tap, shaking of a terminal, that is, a change in acceleration may be used. In this case, the input is an acceleration, and an acceleration sensor or other devices may be used as an input unit. Alternatively, the input may be a predetermined voice input.

The preceding description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising
a communication unit that, if an order and time interval of a rhythmic input operation on a first device representing the information processing device, and a rhythmic input operation on a second device representing another information processing device match at least one predetermined pattern representing a predetermined order and a predetermined time interval, performs a communication associated with the predetermined pattern between the first device and the second device.

2. The information processing device according to claim 1, wherein the at least one predetermined pattern comprises a plurality of predetermined pattern, and the communicating unit performs communication of data according to one of the plurality of predetermined patterns with which an order and time interval of three or more operations match.

3. The information processing device according to claim 2, wherein if there is a plurality of predetermined patterns with which an order and time interval of three or more operations match, the communicating unit performs data communication by giving a higher priority to one of the plurality of predetermined patterns than to another one of the plurality of predetermined patterns.

4. The information processing device according to claim 3, wherein the communicating unit performs data communication by giving priority to a predetermined pattern that includes a large number of operations.

5. The information processing device according to claim 2, wherein the at least one predetermined pattern comprises:
a first pattern including an operation on the first device, followed by an operation on the second device, and followed by an operation on the first device;
a second pattern including an operation on the first device, following by an operation on the first device, and followed by an operation on the second device;
a third pattern including an operation on the first device, followed by an operation on the second device, and followed by an operation on the second device; and
a fourth pattern including an operation on the first device, followed by an operation on the second device, and followed by an operation on each of the first and second devices.

6. The information processing device according to claim 2, wherein the at least one predetermined pattern comprises:
a first pattern including an operation on the first device, followed by an operation on the second device, and followed by an operation on the first device performed after a relatively long period of time;
a second pattern including an operation on the first device, followed by an operation on the second device, and followed by an operation on the second device performed after a relatively long period of time;
a third pattern including an operation on the first device, followed by an operation on the first device, and followed by an operation on the second device performed after a relatively long period of time; and
a fourth pattern including an operation on the first device, followed by an operation on the second device, and followed by an operation on each of the first and second devices performed after a relatively long period of time.

7. The information processing device according to claim 2, wherein the at least one predetermined pattern comprises:
a first pattern including an operation on the first device, followed by an operation on the second device, followed by an operation on the first device, and followed by an operation on the second device;
a second pattern including an operation on the first device, followed by an operation on the second device, followed by an operation on the first device, and followed by an operation on the first device performed after a relatively long period of time;
a third pattern including an operation on the first device, followed by an operation on the second device, followed by an operation on the first device, and followed by an operation on the second device performed after a relatively long period of time;

a fourth pattern including an operation on the first device, followed by an operation on the second device, followed by an operation on the first device, and followed by an operation on each of the first and second devices performed after a relatively long period of time; and a fifth pattern including an operation on the first device, followed by an operation on the second device, followed by an operation on the first device performed after a relatively long period of time, and followed by an operation on the second device.

8. The information processing device according to claim 2, wherein the at least one predetermined pattern comprises an operation on the first device, followed by an operation on the second device, followed by an operation on the first device, followed by an operation on the second device, and followed by an operation on the first device.

9. The information processing device according to claim 5, wherein the at least one predetermined pattern comprises a relatively strong operation and a relatively weak operation on each of the first and second devices.

10. The information processing device according to claim 5, wherein the at least one predetermined pattern comprises a relatively long operation and a relatively short operation on each of the first and second devices.

11. The information processing device according to claim 1, wherein the communicating unit varies a tolerance used in determining whether an order and time interval of three or more operations match a predetermined pattern, in accordance with a speed with which the three or more operations are performed.

12. The information processing device according to claim 11, wherein the communicating unit causes the tolerance to be relatively high if the speed with which the three or more operations are performed is lower than a reference speed.

13. The information processing device according to claim 1, wherein the communicating unit varies a tolerance used in determining whether an order and time interval of three or more operations match a predetermined pattern, in accordance with an age of a user.

14. The information processing device according to claim 1, wherein the communicating unit varies a tolerance used in determining whether an order and time interval of three or more operations match a predetermined pattern, in accordance with a number of retries performed.

15. The information processing device according to claim 1, wherein the communicating unit varies a tolerance used in determining whether an order and time interval of three or more operations match a predetermined pattern, in accordance with a number of users.

16. The information processing device according to claim 2, wherein the communicating unit performs, when a match with a pattern including a relatively large number of operations occurs, communication of data of higher relative importance than when a match with a pattern including a relatively small number of operations occurs.

17. An information management device comprising
a controller that, if an order and time interval of a rhythmic input operation on a first device and a rhythmic input operation on a second device matches a predetermined pattern representing a predetermined order and a predetermined time interval, causes a communication associated with the predetermined pattern to be performed between the first device and the second device.

* * * * *